May 5, 1931. W. F. STOODY ET AL 1,803,875
METHOD OF FACING TOOLS AND RESULTING PRODUCT
Filed Jan. 30, 1928
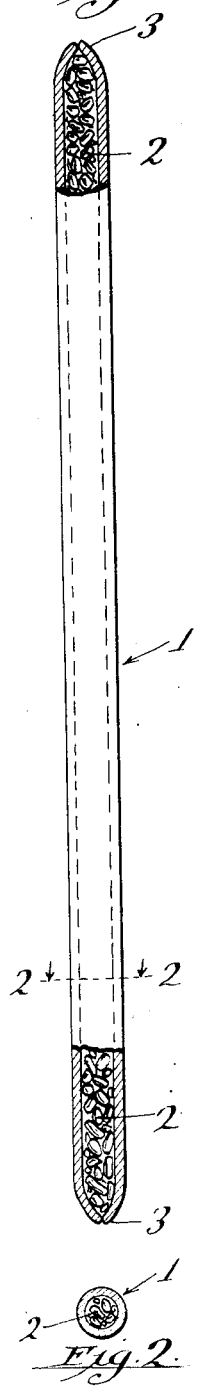
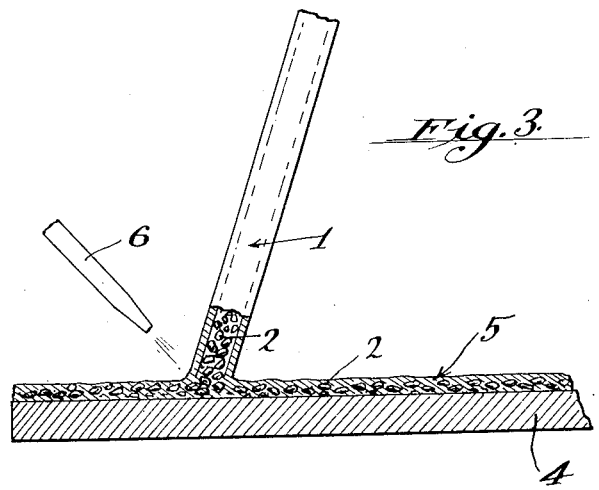
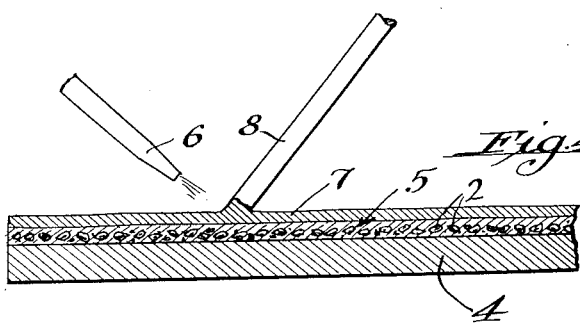
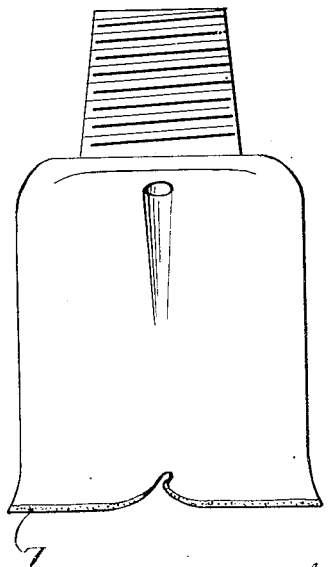
Inventors
W. F. Stoody
S. M. Stoody
N. W. Cole
by Hazard and Miller
Attorneys Patented May 5, 1931

1,803,875

UNITED STATES PATENT OFFICE

WINSTON F. STOODY, SHELLEY M. STOODY, AND NORMAN W. COLE, OF WHITTIER, CALIFORNIA, ASSIGNORS TO STOODY COMPANY, OF WHITTIER, CALIFORNIA, A CORPORATION OF CALIFORNIA

METHOD OF FACING TOOLS AND RESULTING PRODUCT

Application filed January 30, 1928. Serial No. 250,698.

Our invention relates to a method of facing tools and resulting product.

It is an object of this invention to face tools used for cutting, drilling or boring, with a layer of metal in which are embedded pieces or particles of an exceedingly tough and hard material of great wear-resisting properties.

Our invention consists in the method and resulting product hereinafter described and claimed.

In the accompanying drawings which form a part of this specification, we have illustrated the means and manner used in our invention, and in which, Figure 1 is an elevation of a welding rod with parts in section used in our method.

Figure 2 is a cross section taken on the line 2—2 of Figure 1.

Figure 3 shows the depositing of the material of the welding rod on a tool to face the same.

Figure 4 shows the step of depositing the second layer of metal on the first deposited layer on the face of the tool.

Figure 5 shows a fish-tail bit such as used for drilling oil wells, the cutting surfaces of which have been faced with a layer of cutting metal deposited in accordance with our method.

Referring to the drawings, Fig. 1 shows a welding rod used in our method. The same consists of a tubular container 1, made of metal of a comparatively low melting point such as mild steel. The same is filled with pieces or particles 2 of an alloy or element of a considerably higher melting point than the mild steel of which the tube 1 is composed. The tube 1 is preferably pinched together at the ends 3 so as to confine the particles or pieces 2 within the tube. Though any hard and tough alloy of a considerably higher melting point than mild steel may be used in place of the pieces or particles 2, we prefer to use a carbide of tungsten.

The alloy just referred to is described and claimed in our co-pending application for an alloy, Serial No. 250,699, filed January 30, 1928, and the welding rod itself is described and claimed in our co-pending application for welding rod, Serial No. 250,697, filed January 30, 1928 now Patent No. 1,757,601, dated May 6, 1930.

The tool to be faced with a layer of a cutting, drilling or boring surface, is shown at 4. A layer of metal 5, in which the particles 2 are embedded, is deposited thereon by melting the end of the welding rod by any suitable means such as an acetylene torch indicated at 6. On the layer 5 shown in Figure 4, we deposit a top layer 7 by melting a welding rod 8 by means of an acetylene torch 6 or the like. The welding rod 8 is a hard tool steel having a higher melting point than the mild steel 1, in which the particles 2 are embedded. We prefer to use hard tool steel such for example, as set forth in U. S. Patent No. 1,559,015 dated October 27, 1925.

The object of using a mild tool steel as the tube in the welding rod is to provide a bond or binder for the particles 2 of the hard alloy which bond or binder is fusible at a temperature which will not cause the alloy to form gases or oxidize, which would result in fissures or blow-holes.

The mild tool steel forms a bond welded or fused on to the face of the tool. The skin of the mild tool steel covering the particles 2, will protect the same when the steel alloy 7 is fused and deposited on top thereof. If the hard tool steel were used as the tube in the welding rod, there would be danger of the alloy particles being oxidized and forming blow-holes which are avoided by using a tube of mild steel which is of comparatively low fusing point.

The resulting cutting or drilling face of the tool is thus provided with an outer hard and tough layer of tool steel, which, as it is worn down, exposes the still harder and tougher particles and pieces of alloy 2, which form an effective and durable cutting and drilling face of the tool.

While we prefer to deposit a second layer of hard tool steel as just described, good results are also attained where the second layer of metal is omitted and the deposit on the face of the tool consists of the metal derived from the tube of the welding rod in which the pieces of the harder material are imbedded.

Various changes may be made by those skilled in the art without departing from the spirit of our invention as claimed.

We claim:

1. A method of facing tools comprising fusing a layer of metal containing pieces of a material having a greater melting point than said metal upon the face of a tool, and fusing a second layer of a metal on top of the first layer, said second layer having a melting point considerably higher than said first layer.

2. A method of facing tools, fusing a layer of mild steel containing particles of an alloy having a considerably higher melting point than said mild steel upon the face of a tool, and fusing a second layer of tool steel upon said first layer.

3. A method of facing tools comprising fusing a layer of mild steel and containing pieces of an alloy comprising tungsten and carbon on the face of the tool, and fusing a second layer of hard tool steel on said first layer.

4. A tool having an operating face comprising two fused layers, the first layer consisting of a metal of comparatively low melting point having embedded therein pieces of an alloy of a considerably higher melting point, and the second layer comprising tool steel.

5. The method of facing tools which comprises first associating together a metal of relatively low melting point and pieces of a hard substance of relatively high melting point, supplying heat to the associated mass to cause the metal of low melting point to melt and be deposited on the tool and carry with it the pieces of hard substance depositing them on the tool without materially changing their identity, causing a fusion to take place between the metal of low melting point and the metal of the tool, and allowing the metal of low melting point to cool and harden about the pieces and thus anchor them to the tool.

6. The method of facing tools which includes associating together a metal of relatively low melting point and pieces of a hard material of relatively high melting point, depositing the associated mass on a tool by an oxy-acetylene welding flame, causing a fusion to take place between the metal of low melting point and the metal of the tool, and allowing the metal to cool and harden about the hard material to anchor it in place without having melted the hard material to any material extent.

7. The method of facing tools which includes associating together a metal of relatively low melting point and pieces of a tungstic material of relatively high melting point, depositing the associated mass on the tool by an oxy-acetylene welding flame, causing a fusion to take place between the metal of low melting point and the metal of the tool, and allowing the metal to cool and harden about the tungstic material to anchor it in place without having melted the tungstic material to any material extent.

8. The method of facing tools which includes associating a tungstic material with a metal of relatively low melting point, simultaneously depositing the material and metal on a tool, as by welding, with a heat incapable of melting the tungstic material to any material extent, causing a fusion to take place between the metal of low melting point and the metal of the tool, and allowing the metal to cool and harden about the tungstic material and thus anchor the tungstic material in place.

9. The method of facing tools which includes associating a hard material of relatively high melting point with a metal of relatively low melting point, simultaneously depositing the hard material and metal on a tool, as by welding, with a heat incapable of melting the hard material to any material extent, causing a fusion to take place between the metal of low melting point and the metal of the tool, and allowing the metal to cool and harden about the hard material and thus anchor it in place.

10. The method of facing tools which includes associating pieces of an alloy containing tungsten and carbon with a metal of relatively low melting point, simultaneously depositing the alloy and metal on the tool, as by welding, with a heat incapable of melting the alloy to any material extent, causing a fusion to take place between the metal of low melting point and the metal of the tool, and allowing the metal to cool and harden about the alloy and thus anchor the alloy in place.

11. The method of facing tools which includes associating particles of an alloy containing tungsten and carbon which are of such size that they are incapable of being completely melted under a welding temperature with a metal of relatively low melting point, simultaneously depositing the particles and metal on a tool, as by welding, with a heat incapable of melting the particles to any material extent, causing a fusion to take place between the metal of low melting point and the metal of the tool, and allowing the metal to cool and harden about the particles and thus anchor them in place.

12. The method of applying hard metal particles to a surface to be protected thereby which comprises welding a material of low melting point to the surface and simultaneously depositing pieces of a material of high melting point without melting or fusing the particles of high melting point to any material extent, causing a fusion to take place between the material of low melting point and the material forming the surface, and allowing the molten material to cool and harden about the pieces of material of high melting point and thus fasten them to the surface to be protected.

13. The method of applying hard metal particles to a surface to be protected thereby which comprises associating together pieces of material of high melting point with a material of low melting point and welding the associated materials on the surface without melting or fusing the pieces of material of high melting point to any material extent, causing a fusion to take place between the material of low melting point and the material forming the surface, and allowing the molten material to cool and harden about the pieces of material of high melting point and thus fasten them to the surface to be protected.

14. The method of applying hard particles to a surface to be protected thereby which comprises inclosing pieces of material of high melting point in a material of low melting point and welding both materials on the surface without melting or fusing the pieces of material of high melting point to any material extent, causing a fusion to take place between the material of low melting point and the material forming the surface, and allowing the molten material to cool and harden about the pieces of material of high melting point and thus fasten them to the surface to be protected.

15. The method of applying hard particles or pieces to a surface to be protected thereby which comprises associating the particles or pieces with a material of relatively low melting point, depositing both materials on the surface as by welding, causing a fusion to take place between the material of low melting point and the material forming the surface, and allowing the molten material of low melting point to cool and harden about the particles or pieces and thus fasten them to the surface.

16. The method of applying hard particles to a surface to be protected thereby which comprises associating together pieces of material of high melting point with a material of low melting point, welding the associated materials on the surface without melting or fusing the pieces of material of high melting point to any material extent, allowing the molten material to cool and harden about the pieces of material of high melting point and thus fasten them to the surface to be protected, and coating the applied materials with a protecting coating of metal.

17. The method of applying hard particles to a surface to be protected thereby which comprises depositing pieces of a material of high melting point together with a material of low melting point on the surface, supplying heat to the materials to melt the material of low melting point, and causing a fusion to take place between the material of low melting point and the material forming the surface without melting or fusing the pieces of material of high melting point to any material extent, allowing the molten material to cool and harden about the pieces of material of high melting point and thus fasten them to the surface to be protected.

18. The method of forming a drilling or cutting tool that includes, securing a cutting element to a cutter body by a fusible and comparatively tough material, and applying to the surface of the cutter body about said element a sheath of comparatively brittle material.

19. The method of forming a drilling or cutting tool that includes securing a cutting element to a cutter body by a fusible and comparatively tough material, and covering said element and the surface of the cutter body with a sheath of comparatively hard and brittle material.

20. The method of forming a drilling or cutting tool that includes, applying a cutting element to a cutter body in a matrix of comparatively tough material, and covering said element and the surface of the cutter body with a sheath of comparatively brittle material, the last mentioned material being of greater hardness than the material forming the matrix.

21. The method of forming a drilling or cutting tool that includes, applying a cutting element to a cutter body in a matrix of comparatively tough material, and covering said element and the surface of the cutter body with a sheath of comparatively brittle material, the materials forming the cutting element, sheath and matrix being respectively of decreasing hardness.

22. The method of forming a drilling or cutting tool that includes studding a cutter body with cutting elements secured to the body in a fused matrix of comparatively tough material, and covering the studded surface of said body with a fused sheath of comparatively brittle material, the last mentioned material being of greater hardness than the material forming the matrix.

23. The method of forming a built-up cutter blade that includes studding the blade along its edge with cutting elements secured to the blade in a fused matrix of comparatively tough material, and covering the studded face of the blade with a fused sheath of comparatively harder and brittle material.

24. A drill bit embodying a cutter body, a cutting element secured to said body in a fused matrix of comparatively tough and soft metal, and a fused sheath of comparatively harder and brittle material covering the surface of the cutter body and embedding said cutting element.

25. A drill bit embodying a cutter body studded with cutting elements, said elements being secured to the body in a fused matrix of comparatively tough material, and a fused sheath of comparatively harder and brittle material covering the studded face of the body.

In testimony whereof we have signed our names to this specification.

WINSTON F. STOODY.
SHELLEY M. STOODY.
NORMAN W. COLE.